US010732871B2

(12) United States Patent
Benisty et al.

(10) Patent No.: US 10,732,871 B2
(45) Date of Patent: *Aug. 4, 2020

(54) STORAGE DEVICE AND METHOD FOR ADAPTIVE SLEEP MODE TRANSITIONS

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL); Alexander Bazarsky, Holon (IL); Alon Marcu, Tel-Mond (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 15/918,019

(22) Filed: Mar. 12, 2018

(65) Prior Publication Data

US 2019/0129636 A1  May 2, 2019

Related U.S. Application Data

(63) Continuation-in-part of application No. 15/800,148, filed on Nov. 1, 2017, now Pat. No. 10,489,072.

(51) Int. Cl.
| *G06F 3/06* | (2006.01) |
| *G06N 3/08* | (2006.01) |
| *G06N 3/04* | (2006.01) |
| *G06F 1/32* | (2019.01) |

(52) U.S. Cl.
CPC .............. *G06F 3/0634* (2013.01); *G06F 1/32* (2013.01); *G06F 3/0625* (2013.01); *G06F 3/0673* (2013.01); *G06N 3/04* (2013.01); *G06N 3/08* (2013.01); *G06F 3/0653* (2013.01)

(58) Field of Classification Search
CPC ........ G06F 1/32; G06F 3/0625; G06F 3/0634; G06F 3/0653; G06F 3/0673; G06N 3/04; G06N 3/08
See application file for complete search history.

(56) References Cited

U.S. PATENT DOCUMENTS

| 9,110,677 | B2 | 8/2015 | Ravimohan et al. |
| 9,514,837 | B2 | 12/2016 | Shapira et al. |
| 2011/0173474 | A1* | 7/2011 | Salsbery ............... G06F 1/206 713/323 |
| 2013/0166932 | A1 | 6/2013 | Larovici et al. |
| 2013/0290758 | A1* | 10/2013 | Quick ................. G06F 1/3203 713/323 |
| 2015/0012671 | A1 | 1/2015 | Park et al. |
| 2015/0121106 | A1 | 4/2015 | Eckert et al. |
| 2015/0142996 | A1 | 5/2015 | Lu |
| 2015/0347012 | A1 | 12/2015 | Dewitt et al. |
| 2016/0103481 | A1 | 4/2016 | Griffith et al. |
| 2017/0024002 | A1 | 1/2017 | Tzafrir et al. |
| 2019/0129636 | A1* | 5/2019 | Benisty ................ G06F 3/0634 |

\* cited by examiner

*Primary Examiner* — Terrell S Johnson
(74) *Attorney, Agent, or Firm* — Patterson & Sheridan, LLP; Steven H. Versteeg

(57) ABSTRACT

A method of transitioning between a sleep mode for a storage device to reduce power consumption and to increase responsiveness includes collecting one or more recent parameters related to host-storage device workload. The host-storage device workload is correlated to project a next host idle time. A transition between a storage sleep mode is determined.

29 Claims, 12 Drawing Sheets

STORAGE DEVICE AND METHOD FOR ADAPTIVE SLEEP MODE TRANSITIONS

CROSS-REFERENCE TO RELATED APPLICATIONS

This application is a continuation-in-part of co-pending U.S. patent application Ser. No. 15/800,148, filed Nov. 1, 2017. The aforementioned related patent application is herein incorporated by reference.

BACKGROUND OF THE DISCLOSURE

Field of the Disclosure

Aspects of the disclosure relate to computer memory storage devices. More specifically, aspects relate to optimizing power savings versus performance in memory storage devices by transitioning between a sleep mode based upon a host idle time projection.

Description of the Related Art

As central processing units (CPUs) continue to become faster, the memory units that supply the data to the CPUs need to continually become faster as well. In a typical computer system, a variety of different memory devices are employed to meet the needs of a particular application, wherein each memory device provides a trade-off in storage capacity, cost, power consumption, and response time. System performance is maximized by utilizing the devices in a hierarchy arrangement, utilizing both extremely fast, but low-capacity memory devices in combination with slower, higher capacity memory devices. The memory hierarchy would include both on-chip memory devices (e.g., processor registers, caches, etc.) as well as off-chip memory devices (e.g., main memory devices and disk storage). For example, a computer system comprising a host system may employ a hard disk drive (HDD) as the disk storage device and a dynamic random access memory (DRAM) as the main memory. The hard disk drive provides cheaper storage (i.e., cost/GB), and higher capacity, but slower response time. In contrast, the DRAM device provides faster response time, but at higher cost and lower capacity.

In recent years, non-volatile memory (NVM) devices in the form of solid-state drives (SSD) have been employed as a complementary type of storage, used either instead of or in conjunction with a HDD. The NVM devices provide faster response time than a typical HDD, but at a slightly higher cost per gigabyte (GB). Both are located "off-board", and therefore communicate with the CPU or host system via a data bus. As such, HDD and NVM devices are often referred to as an "Input/Output (I/O) Memory Tier", because they require input/output operations to communicate with the CPU (referred to herein as the host system).

A storage device, such as an HDD or an SSD, includes one or more processors, such as a central processing unit (CPU), that execute various tasks, such as receiving host commands, executing read and write operations to memory devices, performing maintenance operations (such as garbage collection or wear leveling), and the like. In some examples, the storage device may include multiple processors, such as a multi-core CPU, where each core effectively represents a different CPU. In a multiple processor environment, the storage device may perform multiple tasks simultaneously.

An HDD or SSD of a storage system may enter a low power mode (sleep mode) based on host idle time or a host directive. When the HDD or the SSD enters the sleep mode, the HDD or SSD sustains a performance "penalty" due to entering a sleep mode. Entering sleep mode latency is the time it takes the HDD or SSD to power down (e.g., power down circuits, unload firmware, unconfigure state machines, etc.). The HDD or SSD typically exits the sleep mode based on incoming host activity. When the HDD or the SSD exits the sleep mode initiated by a host activity, the HDD or SSD sustains a performance "penalty" due to exit latency. Exit latency is the time it takes the HDD or SSD to make itself ready (e.g., power up circuits, load firmware, configure state machines, etc.). This entering sleep mode latencies and exiting sleep mode latencies delay the HDD or SSD handling of the incoming host requests thereby sustaining negative user perceived responsiveness.

Low power transition timing is a tradeoff between responsiveness and power consumption. Previous attempts to optimize the tradeoff employ different idle time settings over variety of workloads to determine an "optimum" value. This timeout is static and thus does not scale in real time to workload changes. Further, if sleep mode entry is delayed for too long or exited too early, power is wasted. If sleep mode is entered too early or exited too late, then responsiveness is hurt by waiting for the exit latency.

Therefore, there is a need in the art for improved power consumption and device responsiveness.

SUMMARY OF THE DISCLOSURE

In one embodiment, a method of transitioning between a sleep mode for a storage device to reduce power consumption and to increase responsiveness includes collecting one or more recent parameters related to host-storage device workload. The host-storage device workload is correlated to project a next host idle time. A transition between a storage sleep mode is determined.

In another embodiment, a storage device includes a non-volatile memory. A controller is coupled to the non-volatile memory. The controller includes a host interface and a neural network. The neural network is operable to receive one or more parameter inputs of host storage-device workload and to output a sleep mode projection for the storage device based upon the one or more parameter inputs.

In yet another embodiment, a method of transitioning between a sleep mode for a storage device to reduce power consumption and to increase responsiveness includes offline training of a neural network of a controller of the storage device. A sleep mode projection is determined using the neural network during online use of the storage device. The neural network is trained online by determining if the sleep mode projection is accurate and by updating the neural network.

In still another embodiment, a storage device includes a non-volatile memory means and an interface means for interfacing with a host. A neural network controller means for determining a sleep mode projection is coupled to the non-volatile memory means and the interface means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
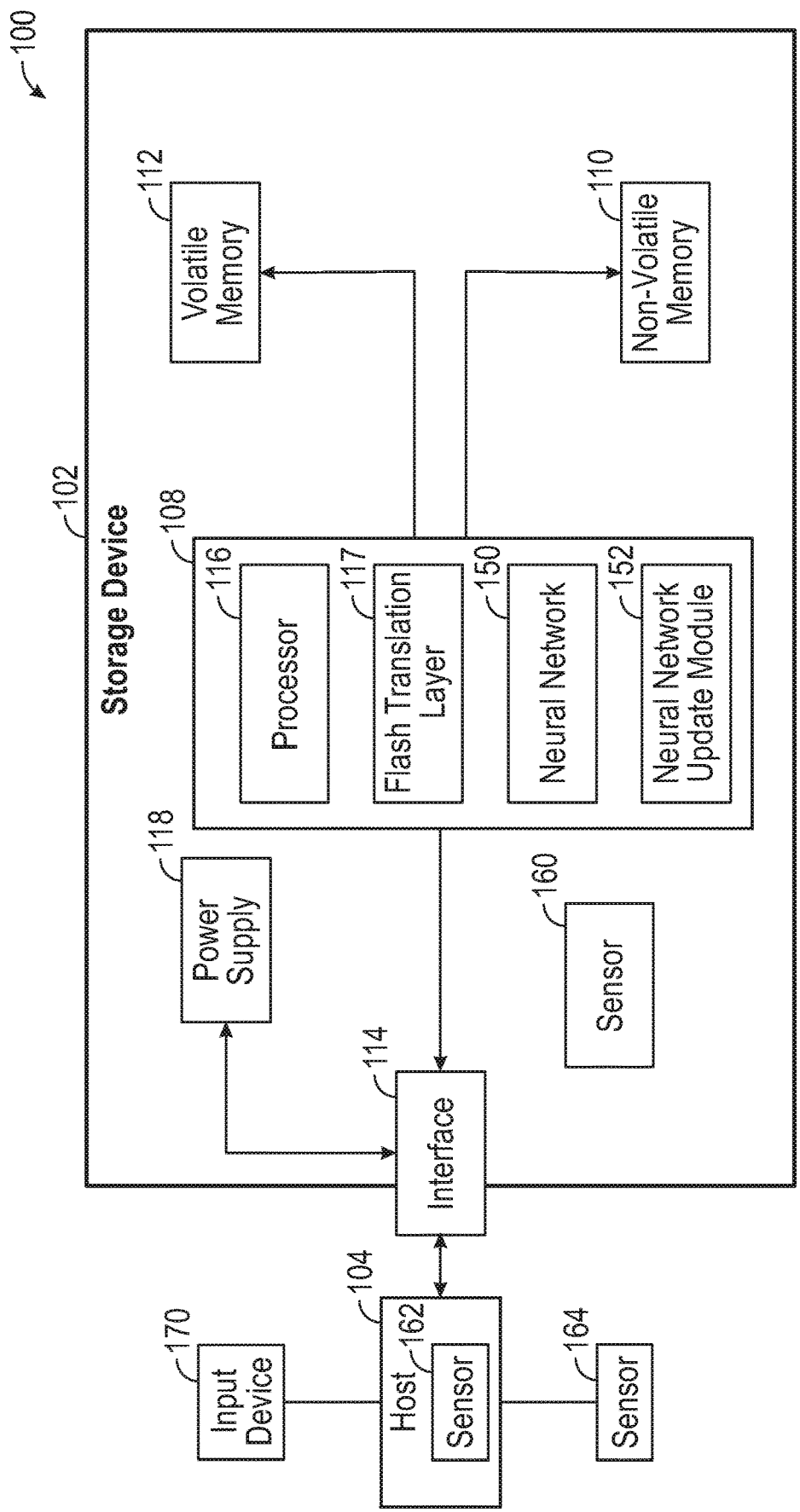
FIG. 1 is a conceptual and schematic block diagram illustrating an example storage environment in which storage device may function as a storage device for host, in accordance with one or more techniques of this disclosure.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

In general, this disclosure describes a controller of a storage device that analyzes data comprising a plurality of previous host idle times to identify a trend in the previous host idle time. The controller projects a next host idle time based on the trend. The controller determines a transition from a storage device active mode to a next storage device sleep mode or a transition from a storage device sleep mode to a next storage device active mode based on the projected host idle time.

In some examples, the controller postpones the transition from the active mode to the next storage device sleep mode based on the projected host idle time. In other examples, the controller expedites the transition from the active mode to the next storage device sleep mode based on the projected host idle time.

In certain embodiments, the controller of a storage device learns to reduce entering sleep mode latencies and/or exiting sleep mode latencies to improve the performance of the storage device. In certain embodiments, the controller of a storage device learns, such as through a neural network or machine learning, based upon correlating a workload between a host and storage device to project a host idle time to reduce entering sleep mode latencies and/or exiting sleep mode latencies. In certain embodiments, the controller of a storage device updates the neural network model based upon an online use of the storage device. The updates may be based on determining whether prior idle time projections were accurate. The updates may be tailored to a specific user behavior/operation of the storage device.

FIG. 1 is a conceptual and schematic block diagram illustrating one example of a storage environment 100 in which a storage device 102 may function as a storage device for a host 104, in accordance with one or more techniques of this disclosure. For instance, host 104 may utilize non-volatile memory devices included in storage device 102 to store and retrieve data. In some examples, storage environment 100 may include a plurality of storage devices, such as storage device 102, which may operate as a storage array. For instance, storage environment 100 may include a plurality of storages devices 102 configured as a redundant array of inexpensive/independent disks (RAID) that collectively function as a mass storage device for host 104. Storage device 102 may be, for example, a solid state drive (SSD), a hard disk drive (HDD), a hybrid drive, which includes both solid state memory and magnetic media, or the like.

Storage environment 100 includes a host 104 which may store and/or retrieve data to and/or from one or more storage devices, such as storage device 102. As illustrated in FIG. 1, host 104 communicates with storage device 102 via an interface 114. Host 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, autonomous vehicles, and the like. Typically, host 104 comprises any device having a processor, which may refer to any form of hardware capable of processing data and may include a general purpose processing unit, such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. Host 104 may be connected, wired or wireless, to an input device 170. Example of input devices, include a touch pad, a touch display screen, a mouse, a keyboard, other peripheral devices, or other input devices.

As illustrated in FIG. 1, storage device 102 includes a controller 108, a non-volatile memory 110 (NVM 110), a power supply 118, a volatile memory 112, and an interface 114. In some examples, the storage device 102 may include additional components not shown in FIG. 1 for sake of clarity. For example, storage device 102 may include a printed board (PB) to which components of the storage device 102 are mechanically attached and which includes electrically conductive traces that electrically interconnect components of storage device 102, or the like. In some examples, the physical dimensions and connector configurations of the storage device 102 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 102 may be directly coupled (e.g., directly soldered) to a motherboard of host 104.

Interface 114 for interfacing with the host 104 may include one or both of a data bus for exchanging data with host 104 and a control bus for exchanging commands with host 104. Interface 114 may operate in accordance with any suitable protocol. For example, interface 114 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of interface 114 (e.g., the data bus, the control bus, or both) is electrically connected to controller 108, providing electrical connection between host 104 and controller 108, allowing data to be exchanged between host 104 and controller 108. In some examples, the electrical connection of interface 114 may also permit storage device 102 to receive power from host 104. For example, as illustrated in FIG. 1, power supply 118 may receive power from host 104 via interface 114.

Storage device 102 may include power supply 118, which may provide power to one or more components of storage device 102. When operating in a standard mode, power supply 118 may provide power to the one or more components using power provided by an external device, such as host 104. For instance, power supply 118 may provide power to the one or more components using power received from host 104 via interface 114. In some examples, power supply 118 may include one or more power storage components configured to provide power to the one or more components when operating in a shutdown mode, such as where power ceases to be received from the external device. In this way, power supply 118 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 102 includes volatile memory 112, which may be used by controller 108 to temporarily store information. In some examples, controller 108 may use volatile memory 112 as a cache. For instance, controller 108 may store cached information in volatile memory 112 until the cached information is written to NVM 110. Volatile memory 112 may consume power received from power supply 118 to maintain the data stored in volatile memory 112. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 102 includes controller 108, which may manage one or more operations of the storage device 102. For instance, controller 108 may manage the reading of data from and/or the writing of data to NVM 110 or volatile memory 112. In some examples, controller 108 may manage the reading of data from and/or the writing of data to NVM 110 or volatile memory 112 by exchanging signals with NVM 110 or volatile memory 112. As discussed above, controller 108 may exchange signals with NVM 110 or volatile memory 112 in accordance with a communication protocol.

Controller 108 includes one or more processors 116 (collectively, "processor 116"). Processor 116 may be configured to execute tasks. The tasks may be of different types, and, in some examples, each respective type of task may be stored in or associated with a respective task queue while waiting for execution by the processor 116. The different types of tasks may include, for example, front end tasks, which may include receiving and interpreting instructions received from host 104. Other types of tasks including caching; back-end tasks, which may include reading data from or writing data to NVM 110; housing-keeping, which may include garbage collection, wear leveling, TRIM, or the like; and system tasks. In some examples, the processor 116 may be referred to as a computer unit, a processing unit, a core, or a central processing unit (CPU). Controller 108 includes a flash translation layer (FTL) 117. FTL 117 determines the physical block addresses (PBAs) associated with the logical block addresses (LBAs) of host commands and storage device tasks.

In embodiments of the present disclosure, controller 108 or host 104 reduces entering sleep mode latencies and/or exiting sleep mode latencies to reduce an impact on responsiveness of storage device 102. Controller 108 may optimize for both power and responsiveness at the same time.

Controller 108 is configured to analyze data comprising a plurality of previous host idle times to identify a trend in the previous host idle times. The controller 108 is configured to project a next host idle time based on the trend. The controller 108 is configured to determine a transition of storage device 102 from a storage device active mode to a next storage device sleep mode or a transition from a storage device sleep mode to a next storage device active mode based on the projected host idle time. Controller 108 may include a neural network 150 or machine learning block residing in firmware and/or hardware. Neural network 150 receive or collect inputs to output a projected host idle time for storage device to transition between a sleep mode (i.e., entering, exiting, or both entering and exiting). Controller 108 may include a neural network update module 152 residing in firmware and/or hardware. The neural network update module 152 may update the neural network 150 based upon determining if projections of host idle times and transitions between a sleep mode by neural network 150 were accurate.

Storage device 102 may include on or more sensors 160. Host 104 may include one or more sensors 162 or be connected to one or more sensors 164. For example, sensors may be temperature sensors, audio sensors, touch sensors, motion sensors, accelerometers, light sensors, GPS sensors, etc. For instance, the sensors may be in host 104 and/or storage device 102 used in autonomous driving to determine if the vehicle is in motion or is stationary (such as at a recharging station). For instance, the sensors may be in host 104 or storage device 102 used in a laptop or desktop computer to determine if the laptop or desktop is in a lighted or dark environment.

Figure 2A:
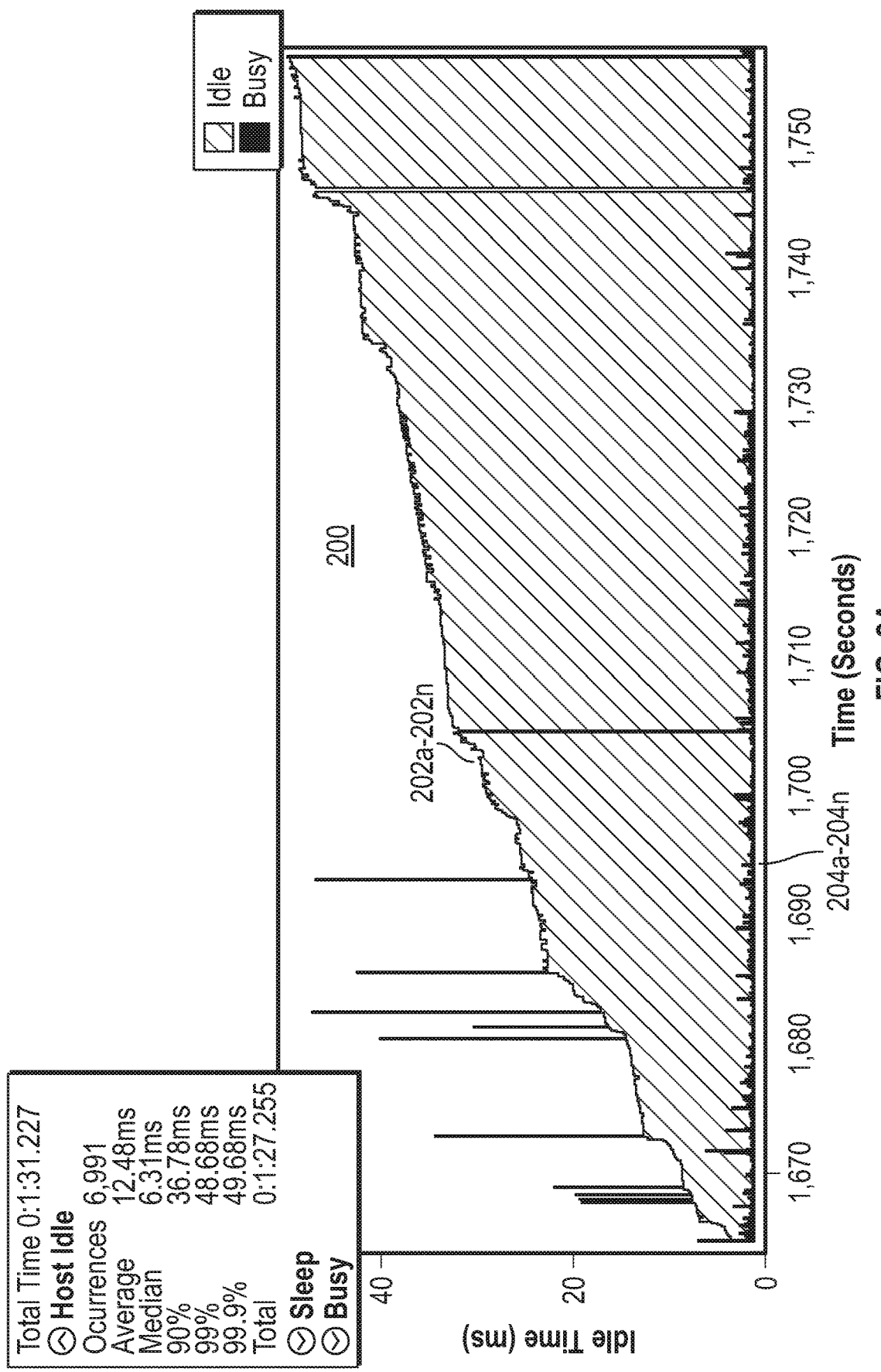
FIG. 2A shows a graph of data collected to plot host idle times versus time elapsed superimposed on a graph of host activity time versus time elapsed.
Figure 2B:
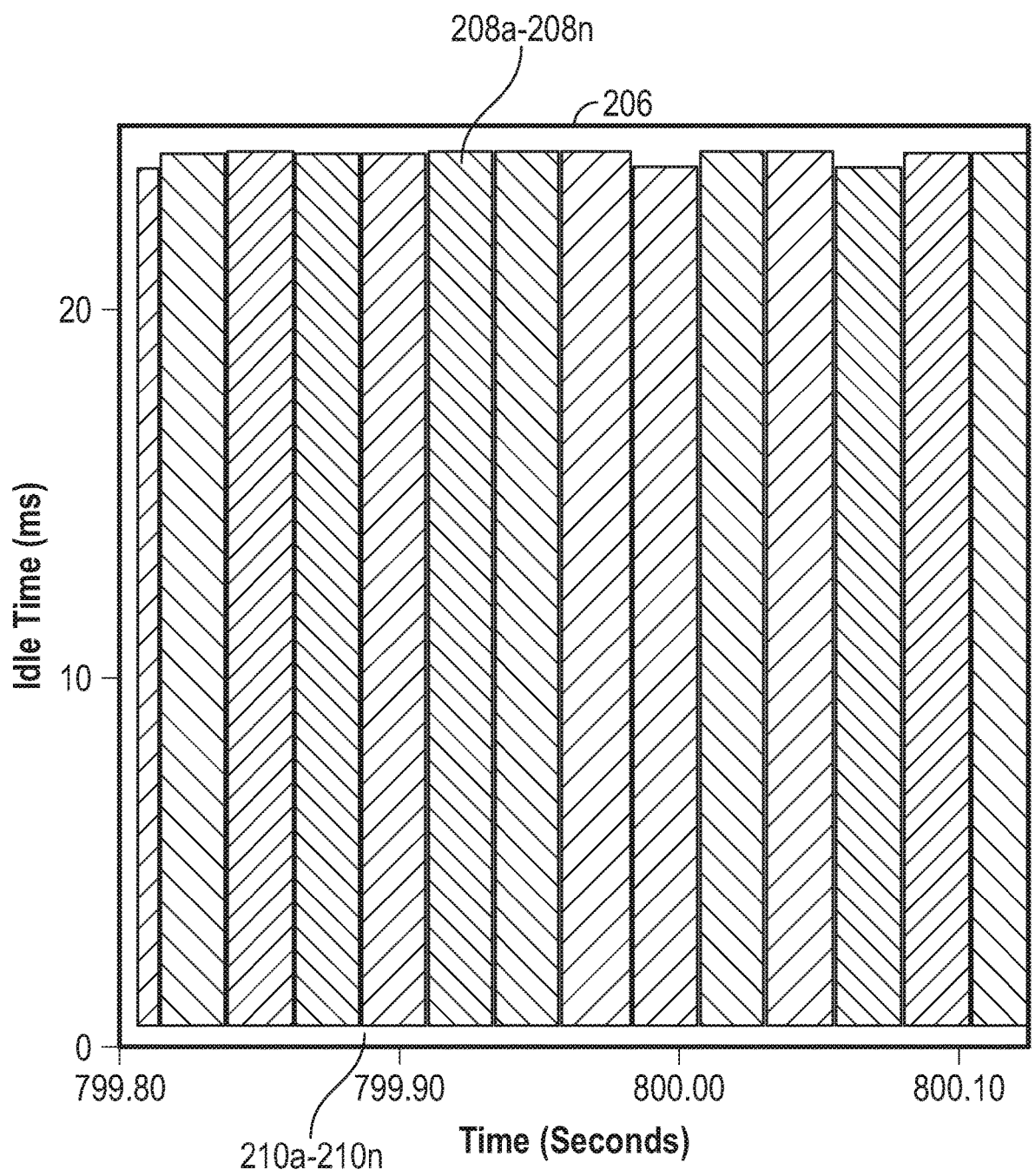
FIG. 2B shows an exploded view of the graphs of FIG. 2A.

FIGS. 2A and 2B show a graph 200, 206 of data collected to plot host idle times versus time elapsed 202a-202n, 208a-208n superimposed on a graph 204a-204n, 210a-210n of host activity time versus time elapsed. Controller 108 may be configured to track the "trend", "contour", or "slope" of graph 200, 206 to provide a projection of a next host idle time. A host activity may be, for example, executing read and write operations to memory devices. Based on one or more host idle time points in the history in the data of graph 200, 206, controller 108 projects the next host idle time. For example, the graph shows consecutive idle times of 100 milliseconds, another at 100 milliseconds, then 110 milliseconds, then 99 milliseconds, and then 100 milliseconds. When controller 108 determines that the last set of idle times was in the range of 100 milliseconds plus or minus one millisecond, then the controller may project that the next idle time may be 100 milliseconds. If the data trends along a contour or slope of 100 milliseconds, 102 milliseconds, 104 milliseconds, and 106 milliseconds, then the controller 108 may project that the host idle time may be 108 milliseconds.

Controller 108 may derive a functional relationship between input elapsed time and idle time according to fitting a curve to a contour of the data. A next idle time may be derived from the fitted functional curve without relying on individual data points.

In one embodiment, controller 108 may postpone the transition of storage device 102 from the active mode to the next storage device sleep mode based on the projected host idle time. In this way, the activity window is kept for some extended time based on projection. In another embodiment, controller 108 may expedite the transition of storage device 102 from the active mode to the next storage device sleep mode based on the projected host idle time. Controller 108 causes storage device 102 to enter the sleep mode as soon as possible to save power. Controller 108 initiates a transition of storage device 102 into the active mode just before an expected host activity, and stays in the active mode for a period of time, accordingly opening the window for an incoming host activity. In still another embodiment, controller 108, may transition storage device 102 from the storage device sleep mode to the next storage device active mode in anticipation of a host activity based on projected host idle time.

In an example, the active mode time lasts from the transition from the storage device sleep mode to the next storage device active mode at a first predetermined time before the projected next host activity time to a transition from the next storage device active mode to a next storage device sleep mode at a second predetermined time after the projected next host activity time. A duration of time between the first predetermined time and the second predetermined time is fixed or adapted based on the analysis.

In an example, controller 108 places storage device 102 in the sleep mode after the second predetermined time has expired.

In one example, controller 108 places storage device 102 in the sleep mode after the second predetermined amount of time has expired. Embodiments of the present disclosure are not limited to placing storage device 102 in the sleep mode after the next activity has elapsed. In another embodiment, controller 108 of storage device 102 enters the sleep mode before the first predetermined time and after the second predetermined time. In another embodiment, NVM 110 of storage device 102 enters the sleep mode before the first predetermined time and after the second predetermined time. In another embodiment, entering the sleep mode may only apply to link layer state management in, e.g., NVMe transitioning from L1.2 (sleep) to L0 (active) link active mode, while the remainder of the storage device 102 remains in active mode, realizing power savings from the link layer only. In another example, entering the sleep mode may be implemented by host 104. Host 104 may estimate when the next application activity arrives and then begin waking up components—including storage device 102—in expectation of sending activity down to storage device 102.

Figure 3A:
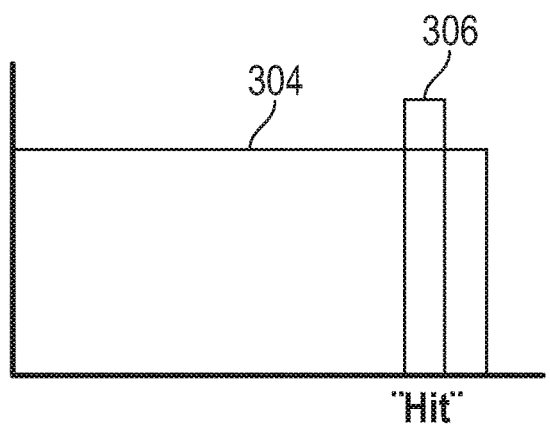
FIGS. 3A-3D illustrate samples of host activity timing "hits" and "misses."
Figure 3B:
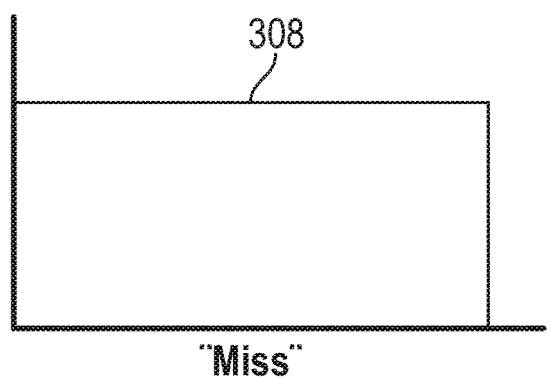
Figure 3C:
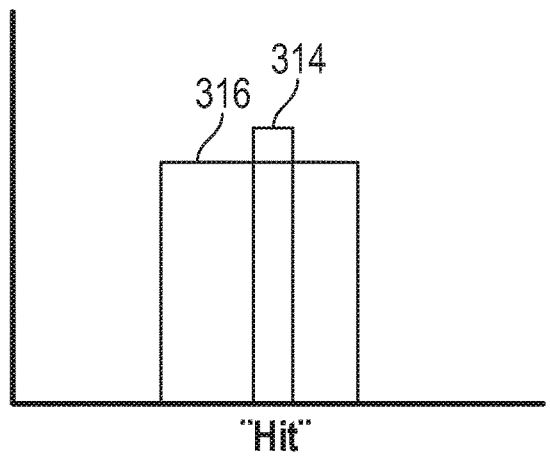
Figure 3D:
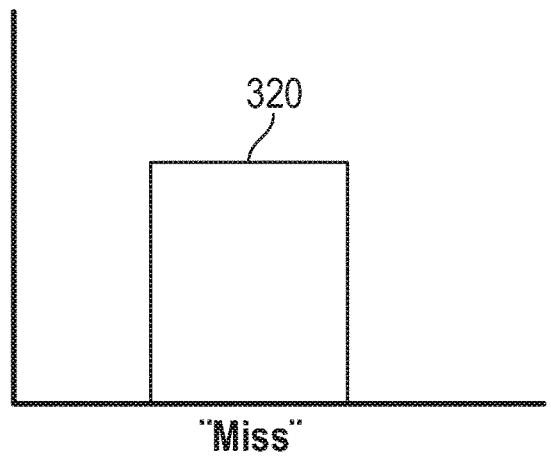

FIGS. 3A-3D illustrate samples of host activity timing "hits" and "misses." FIGS. 3A and 3B illustrate the embodiment wherein controller 108 postpones the transition from active mode to the sleep mode if the controller projects a soon coming host activity. FIG. 3A shows a host activity projection time "hit", while FIG. 3B shows a host activity projection time "miss". FIGS. 3C and 3D illustrate the embodiment wherein controller 108 causes storage device 102 to enter the sleep mode as soon as possible to save power. FIG. 3C shows a host activity projection time "hit", while FIG. 3D shows a host activity projection time "miss". In case of host activity timing projection "hit" (e.g., a host activity 306, 314 arrives when a window 304, 316 is open), when the host activity 306, 314 arrives, storage device 102 is instantly responsive in an active mode. In case of host activity timing projection "miss" (e.g., a host activity not arriving inside a window 308, 320, respectively), the next host activity may arrive much later than projected. To prevent power wastage in the case of a host activity timing projection miss, storage device 102 may transition back to sleep mode, closing the window.

While FIGS. 3A and 3B illustrate a single "window" example, controller 108 may be configured to consider multiple such windows. In one example, host 104 runs multiple applications and each application has a different projected idle time. For example, host 104 may run a virus-scan with 200 ms idle time and a backup application with idle time of 300 ms. In such circumstances, controller 108 may be configured to project multiple idle times. For example, controller 108 may transition to active mode at 190 ms and transition back to sleep mode at 205 ms, opening a first window for servicing the virus-scan. Then, controller 108 transitions to active mode at 290 ms, opening a second window in preparation for servicing the backup application. Further, the length of the window might be fixed or adapted based on history and configuration.

Figure 4:
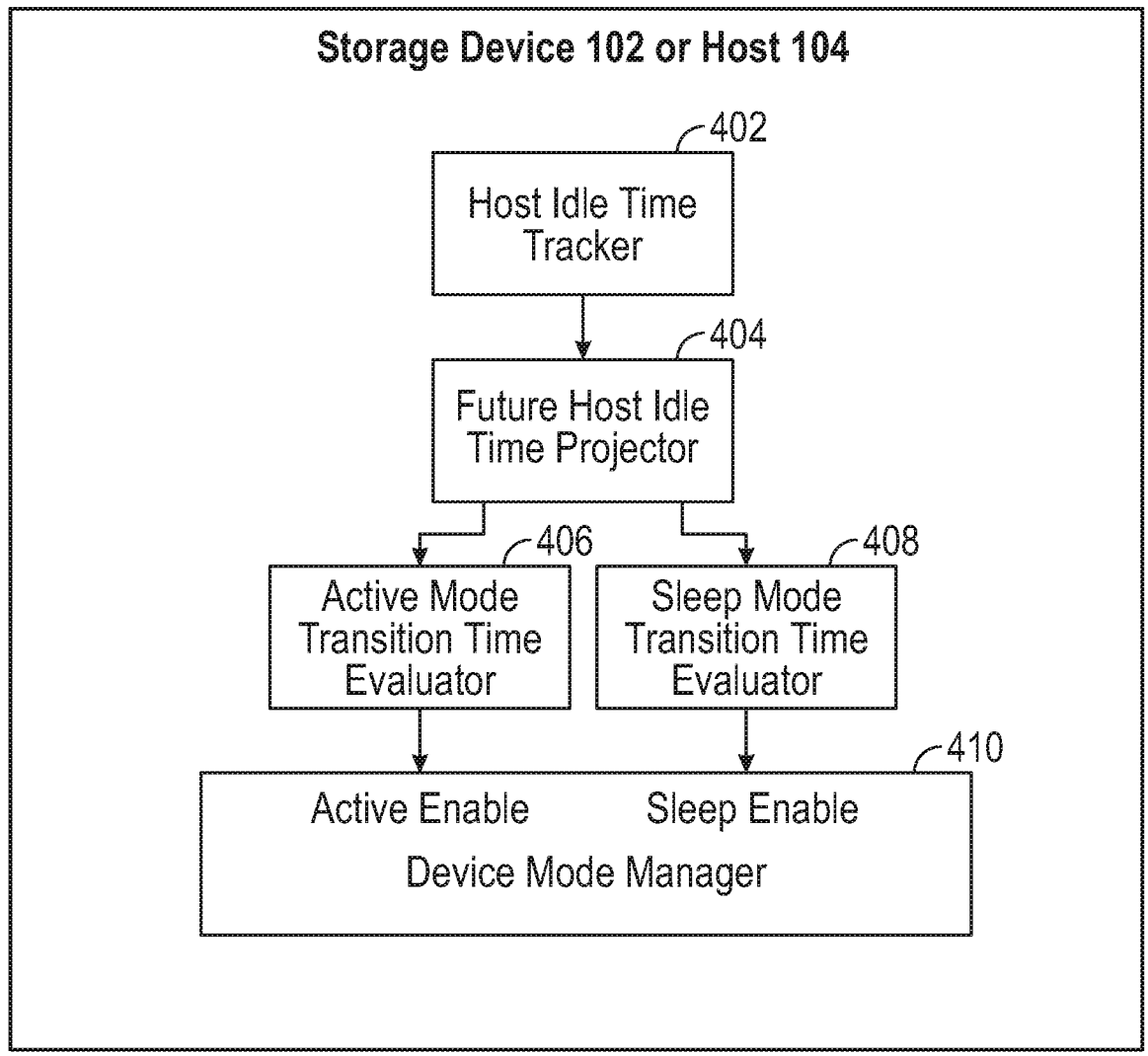
FIG. 4 shows components or modules of functionality contained in the controller.

FIG. 4 shows components or modules of functionality contained in controller 108. The functionality may be implemented in any combination of hardware, firmware, or software. A host idle time tracker 402 measures and keeps track of past host idle time. A future host idle time projector 404 projects a next host idle time based on statistics gathered by the host idle time tracker 402. An active mode transition time evaluator 406 decides when (relative to the beginning of host idle) a transition to active mode may be initiated. A sleep mode transition time evaluator 408 decides when (relative to the beginning of host idle time) a transition to a sleep active mode may be initiated when no host activity has arrived since the transition to active mode. A device mode manager 410 triggers active and sleep active mode transitions based on the timing information determined by the active mode transition time evaluator 406 and the sleep mode transition time evaluator.

Figure 5:
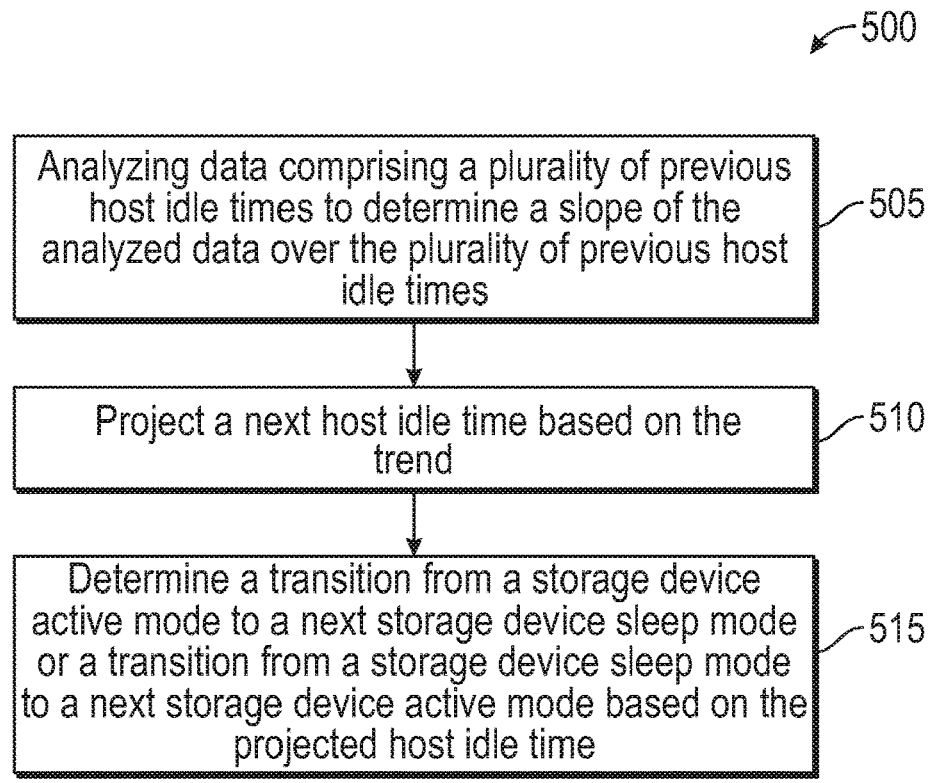
FIG. 5 is a flow diagram of an example of a method of placing a storage device in a sleep mode based on host idle time.

FIG. 5 is a flow diagram of an example of a method 500 of placing a storage device in a sleep mode based on host idle time. For ease of illustration, method 500 of FIG. 5 will be described with concurrent reference to storage device 102 of FIG. 1 and storage device 102 or host 104 of FIG. 4. However, method 500 may be used with any combination of hardware or software.

At block 505, host idle time tracker 402 of controller 108 analyzes data comprising a plurality of previous host idle times to identify a trend in the previous host idle times. At block 510, the future host idle time projector 404 of controller 108 projects a next host idle time based on the trend. In an embodiment, future host idle time projector 404 of controller 108 projects an occurrence of a next host activity based on the projected host idle time. At block 515, active mode transition time evaluator 406 of controller 108 determines a transition of storage device 102 from a storage device active mode to a next storage device sleep mode or a transition from a storage device sleep mode to a next storage device active mode based on the projected host idle time.

In one embodiment, device mode manager 410 of controller 108, working in conjunction with active mode transition time evaluator 406 and sleep mode transition time evaluator 408, may postpone the transition of storage device 102 from the active mode to the next storage device sleep mode based on the projected host idle time. In another embodiment, device mode manager 410 of controller 108, working in conjunction with active mode transition time evaluator 406 and sleep mode transition time evaluator 408, may expedite the transition of storage device 102 from the active mode to the next storage device sleep mode based on the projected host idle time. In still another embodiment, device mode manager 410 of controller 108, working in conjunction with active mode transition time evaluator 406 and sleep mode transition time evaluator 408, may transition storage device 102 from the storage device sleep mode to the next storage device active mode in anticipation of a host activity based on projected host idle time.

In an example, the active mode duration lasts from the transition from the storage device sleep mode to the next storage device active mode at a first predetermined time before the projected next host activity time to a transition from the next storage device active mode to a next storage device sleep mode at a second predetermined time after the projected next host activity time. A duration of time between the first predetermined time and the second predetermined time is fixed or adapted based on the analysis.

In an example, sleep mode transition time evaluator 408 places storage device 102 in the sleep mode after the second predetermined time has expired.

In an example, controller 108 of storage device 102 enters the sleep mode before the first predetermined time and after the second predetermined time. In another example, NVM 110 of storage device 102 enter the sleep mode before the first predetermined time and after the second predetermined time.

In one example, controller 108 of the storage device 102 may execute the method 500. In another example, host 104 may execute method 500.

In another embodiment, method 500 may be performed for a number of different host activities. In another embodiment, the next host activity time may be based on the type of host activity. The length of the window may be fixed or adapted based on the analysis.

Figure 6:
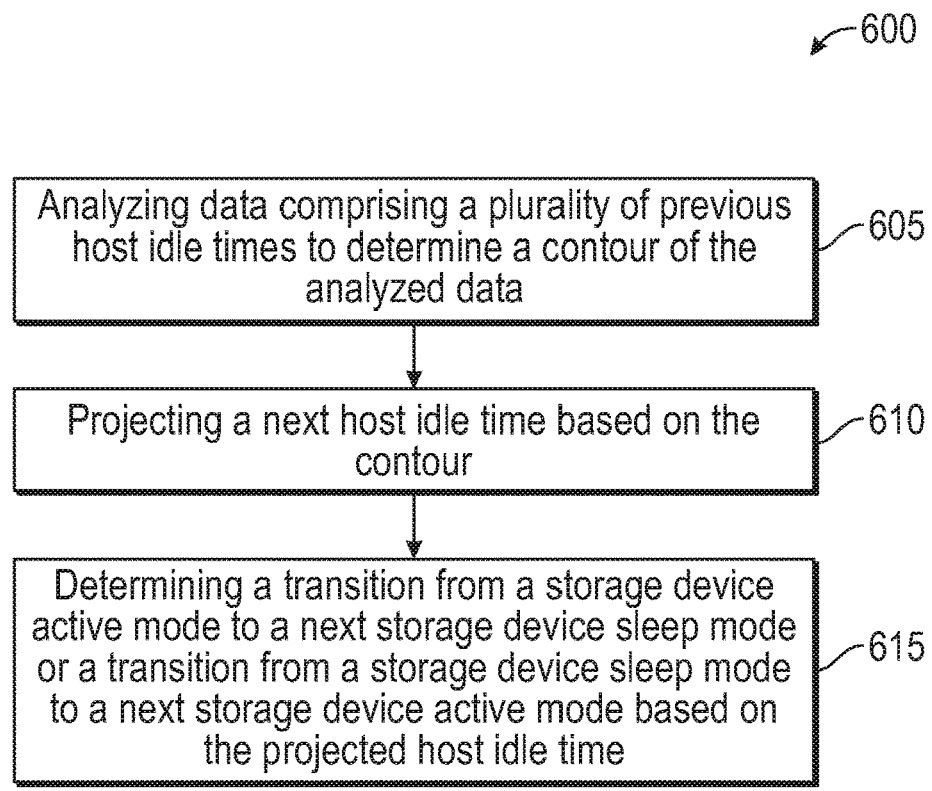
FIG. 6 is a flow diagram of an example of a method of placing a storage device in a sleep mode based on host idle time.

FIG. 6 is a flow diagram of an example of a method 600 of placing a storage device in a sleep mode based on host idle time. For ease of illustration, the method 600 of FIG. 6 will be described with concurrent reference to storage device 102 of FIG. 1 and storage device 102 or host 104 of FIG. 4. However, method 600 may be used with any combination of hardware or software.

At block 605, host idle time tracker 402 of controller 108 analyzes data comprising a plurality of previous host idle times to determine a contour of the analyzed data. At block 610, future host idle time projector 404 of controller 108 projects a next host idle time based on the contour. At block 615, future host idle time projector 404 determines a transition from a storage device active mode to a next storage device sleep mode or a transition from a storage device sleep mode to a next storage device active mode based on the projected host idle time.

Figure 7:
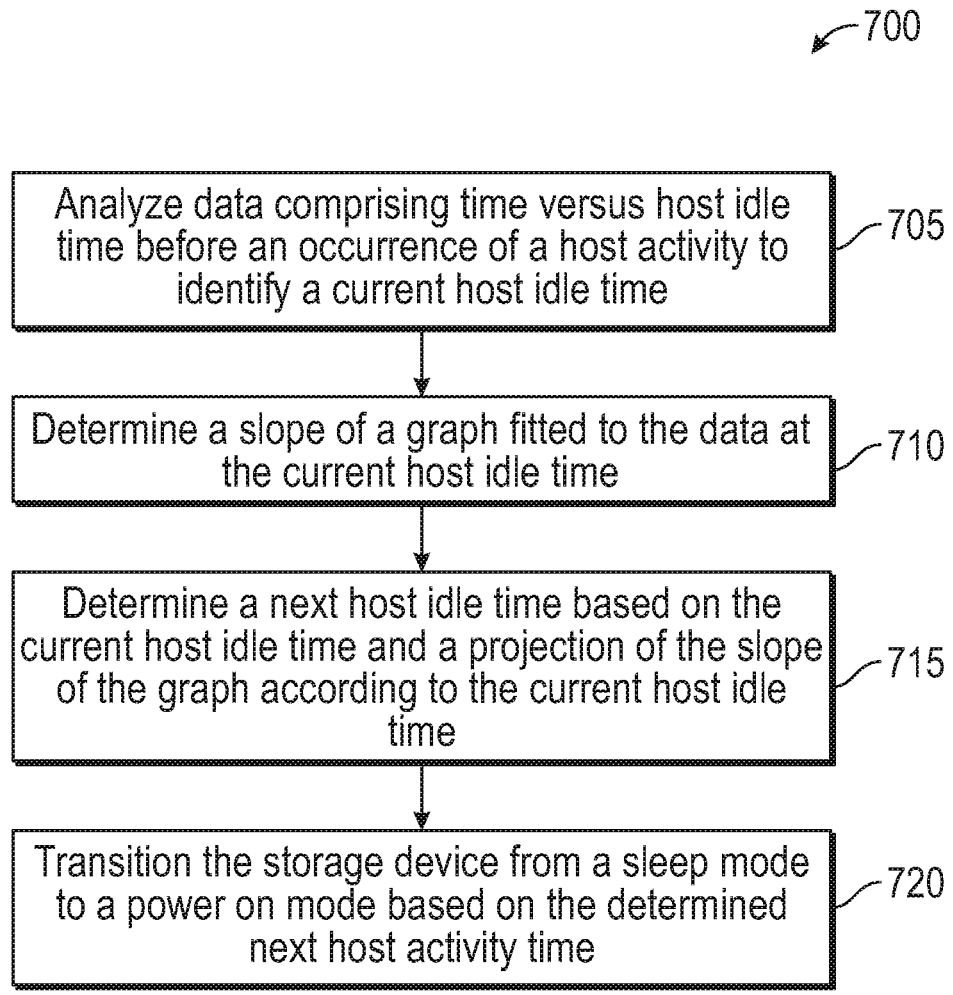
FIG. 7 is a flow diagram of an example of a method of placing a storage device in a sleep mode based on host idle time.

FIG. 7 is a flow diagram of an example of a method 700 of placing a storage device in a sleep mode based on host idle time. For ease of illustration, the method 700 of FIG. 7 will be described with concurrent reference to storage device 102 of FIG. 1 and storage device 102 or host 104 of FIG. However, method 700 may be used with any combination of hardware or software.

At block 705, host idle time tracker 402 of controller 108 analyzes data comprising a plurality of previous host idle times to determine a slope of the analyzed data over the plurality of previous host idle times. At block 710, future host idle time projector 404 of controller 108 determines a graph fitted to the data based on the slope of the analyzed data over the plurality of previous host idle times. At block 715, future host idle time projector 404 projecting a next host idle time based on fitted graph. At block 720, active mode transition time evaluator 406 of controller 108 determining a transition from a storage device active mode to a next storage device sleep mode or a transition from a storage device sleep mode to a next storage device active mode based on the projected host idle time.

Figure 8:
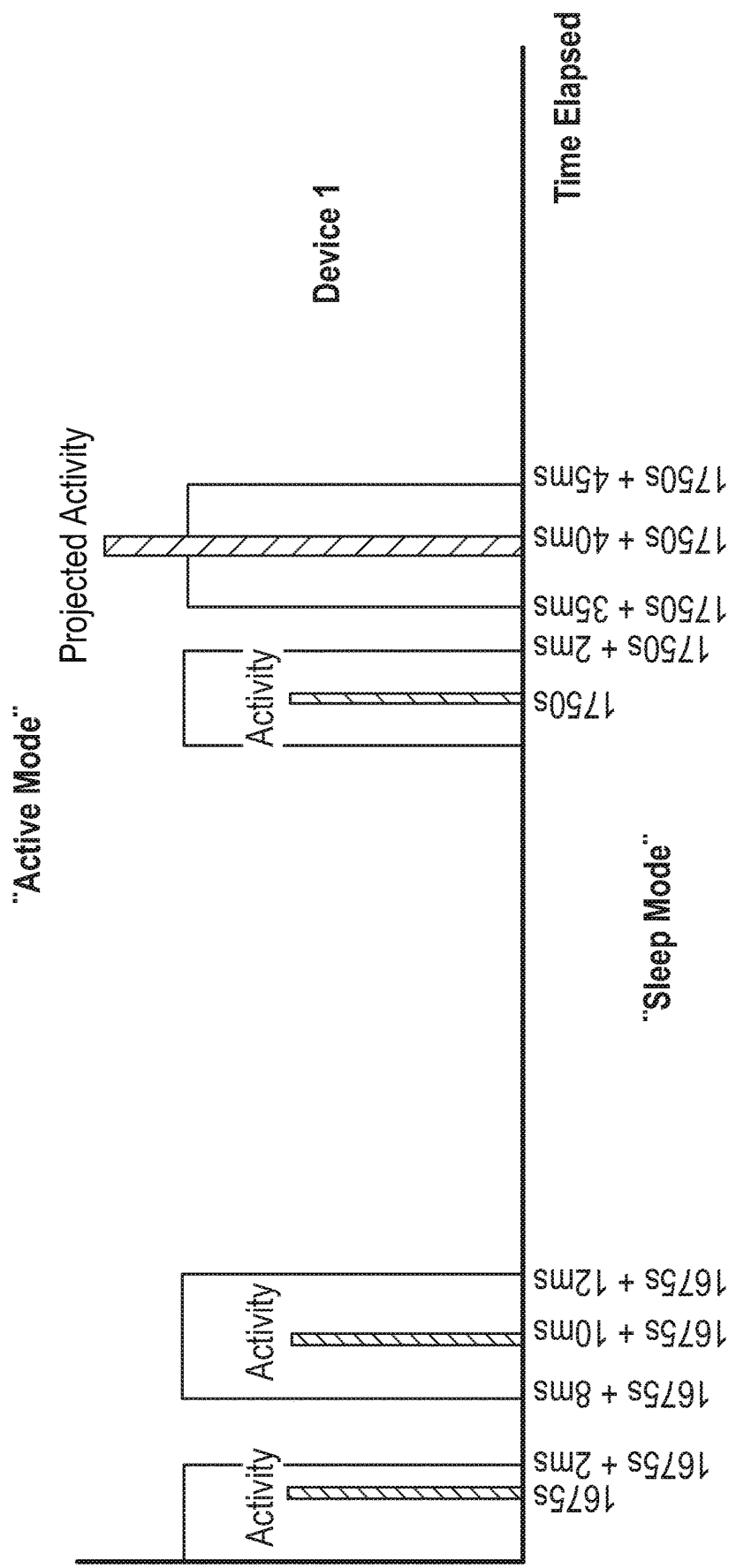
FIG. 8 shows a hypothetical example of placing a storage device in various states of activity based on host idle time and employing the graph of data of FIG. 2.

FIG. 8 shows a hypothetical example of placing a storage device in various state of activity based on host idle time and employing the graph of data of FIG. 2. At time elapsed t=1675 s, a host request has completed and host idle time has started. The graph of FIG. 2 indicates a projected idle time of 10 ms. Therefore, device one projects that a host activity may arrive at time t=1675s+10 ms. At time t=1675 s+2 ms device one enters a sleep mode to save power. At time t=1675 s+8 ms, device one transitions to an active mode in an expectation of a soon-to-arrive host activity. The host activity arrives as expected at time t=1675 s+10 ms.

At time elapsed t=1750 s, a host request has completed and host idle time has started. The graph of FIG. 2 indicates a projected idle time of 40 ms. Therefore, device one projects that a host activity may arrive at time t=1750 s+40 ms. At time t=1750 s+2 ms, device enters the sleep mode to save power. At time t=1750 s+35 ms, device one transitions to the active mode in an expectation of a host activity arriving shortly. In this example, a host activity did not arrive at the projected time. Device one waits for another 5 ms after the projected activity, until time t=1750 s+45 ms. Since no host activity arrives, device one transitions back to sleep mode at time t=1740 s+45 ms.

Embodiments generally relate to a system and a method of learning and adapting to a user behavior of online use of storage device 102 to determine a transition between a sleep mode (i.e., entering, exiting, or both entering and exiting sleep mode) for storage device 102. The system and method may correlate parameters related to host-storage device workload. Since there is a latency from entering sleep mode and exiting sleep mode, storage device 102 may either remain in active mode (full/partial power) rather than to enter sleep mode to respond to commands from host 104, enter sleep mode earlier to correspond to a host idle time, may exit earlier from sleep mode to respond to commands from host 104, or may remain in sleep mode to correspond to a host idle time for enhanced performance and enhanced user experience.

In certain embodiments, storage device 102 determines a transition between a sleep mode using neural network 150. Neural network update module 152 may evaluate if the host idle projections and the sleep mode projections by neural network 150 were accurate and may update neural network 150 to more accurately determine future host idle times and future sleep modes.

Figure 9:
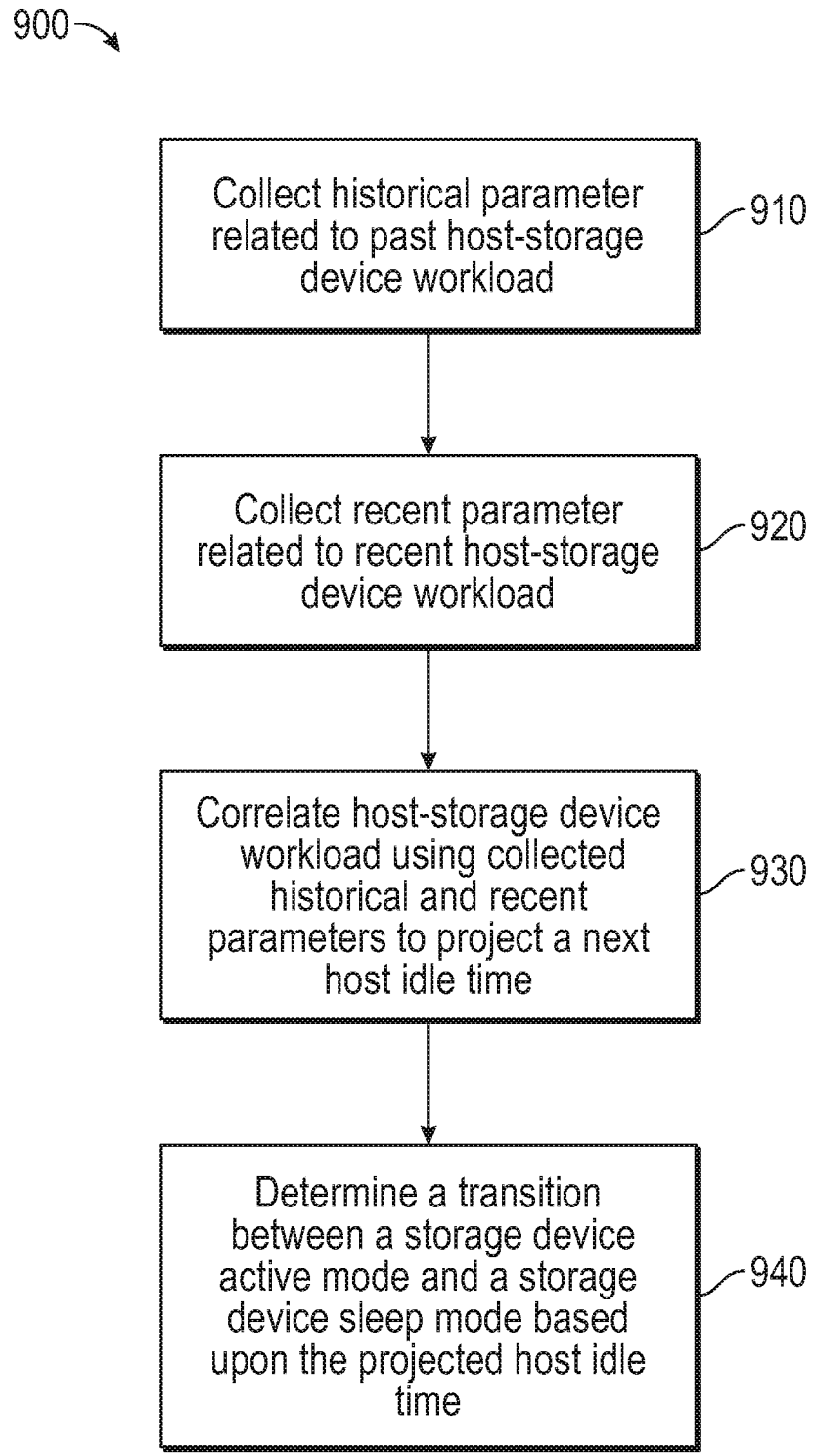
FIG. 9 is a flow diagram of one embodiment of a method of correlating activity or workload between a host and a storage device to determine a transition between a storage device active mode and a storage device sleep mode.

FIG. 9 is a flow diagram of one embodiment of a method 900 of correlating activity or workload between host 104 and storage device 102 to determine a transition between a storage device active mode and a storage device sleep mode. For ease of illustration, method 900 is described in reference to storage device 102 and host 104 of FIG. 1, but other storage devices and hosts may be applicable. Method 900 is performed by controller 108 of storage device 102, but in other embodiments may be performed by host 104 or by both host 104 and storage device 102.

At block 910, one or more historical parameters related to past host-storage device workload are collected. The historical parameters include, but are not limited to: (1) idle state triggers; (2) sleep mode triggers; (3) command LBA ranges; (4) command types; (5) command queue contents; (6) storage device operational states; (7) storage device register contents; (8) sensors; and (9) other suitable parameters. The historical parameters are associated with historical host idle times. Storage device 102 may or may not have entered a sleep mode during the historical host idle times. The historical parameters may be associated with a historical idle time of host 104 when storage device 102 should have entered sleep mode or should have exited sleep mode.

At block 920, one or more recent parameters related to recent host-storage device workload are collected. The recent parameters include, but are not limited to: (1) idle state triggers; (2) sleep mode triggers; (3) command LBA ranges; (4) command types; (5) command queue contents; (6) storage device operational states; (7) storage device register contents; (8) sensors; and (9) other suitable parameters. Recent host-storage device workload may include recently completed commands, current commands being executed, recently completed activities of host 104, current activities of host 104, and other inputs.

At block 930, host-storage device workload is correlated using one or more historical parameters collected at block 910 and one or more recent parameters collected at block 920 to project a next host idle time. For example, correlating may include matching or associating the same, similar, or dissimilar historical parameters and recent parameters of host-storage device workload.

At block 940, a transition between a storage device active mode and a storage device sleep mode is determined based upon the projected host idle time. The transition between a storage device active mode and a storage device sleep mode may be a transition from an active mode to a sleep mode; from a sleep mode to an active mode; from an active mode to a sleep mode and back to an active mode; or from sleep mode to an active mode back to a sleep mode.

For example, a recent parameter of a current host-storage device workload collected may include identifying random operation commands, such as random read commands or random write commands, by host 104 to storage device 102. The random operation commands may be the transfer of data between host 104 and storage device 102 in a size of less than 32 KB. A next host idle time may be projected to be short because another random operation command may be projected to arrive. A transition time from a storage device active mode to a storage device sleep mode may be short or may be immediate so that storage device 102 may wake up from a sleep mode earlier to receive projected incoming host random commands.

For example, a recent parameter of a current host-storage device workload collected may include identifying sequential operation commands, such as a sequential read or a sequential write, by host 104 to storage device 102. The sequential operation commands may be the transfer of data between host 104 and storage device 102 in a size of 32 KB or more. A transition time from a storage device active mode to a next storage device sleep mode may be delayed so that storage device 102 waits to see if another host command arrives prior to entering a sleep mode for a long duration.

Figure 10:
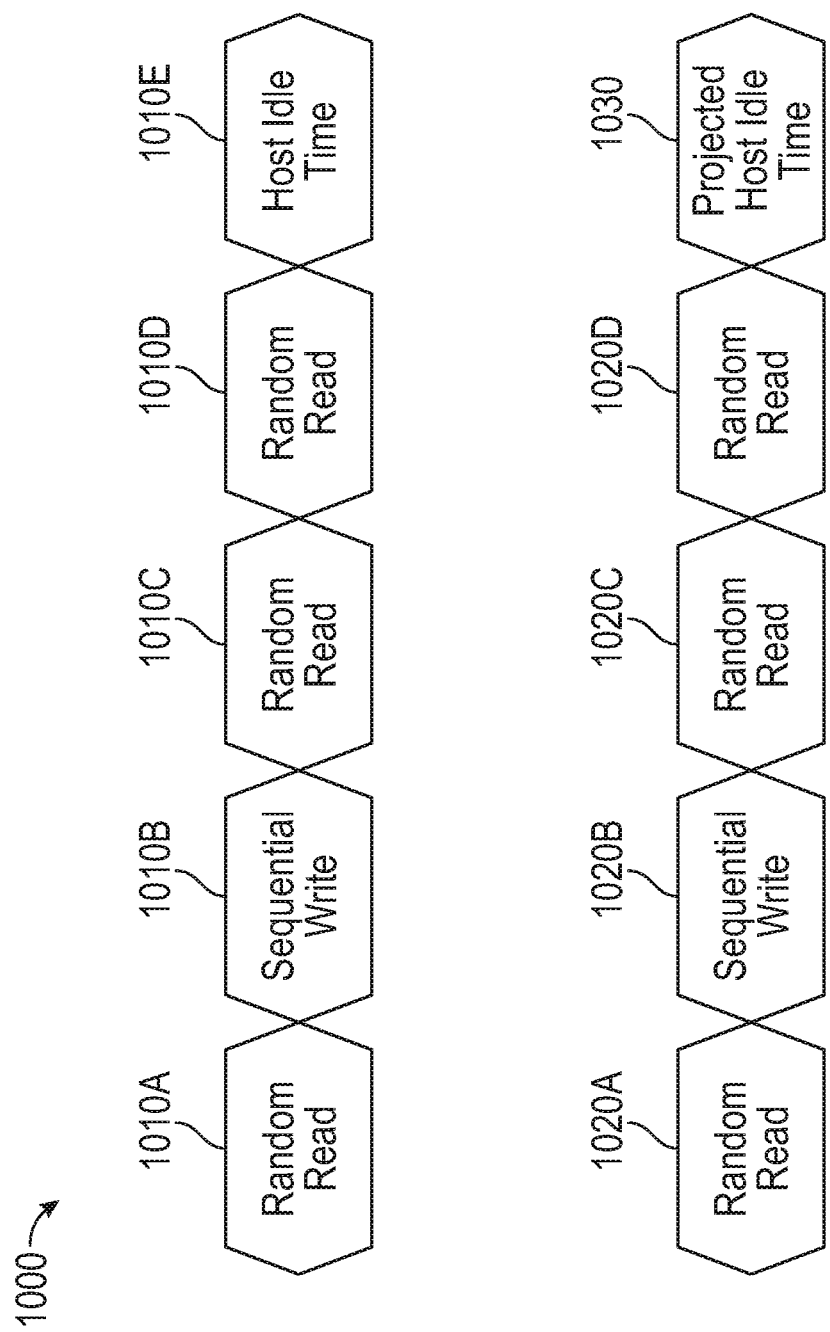
FIG. 10 is a schematic diagram of one example of correlating host-storage device workload using collected parameters

FIG. 10 is a schematic diagram 1000 of one example of correlating host-storage device workload using one or more collected parameters, such as the collected parameters in block 910 and block 920 of method 900.

Storage device 102 may collect a plurality of historical parameters 1010 and a plurality of recent parameters 1020. As shown in FIG. 10, the historical parameters 1010 are examples of certain historical states of storage device 102 over time, and the recent parameters 1020 are certain recent states or recent current states of storage device 102 over time.

In the example shown in FIG. 10, historical parameters 1010 include receiving from host 104 a random read command 1010A, followed by a sequential write command 1010B, followed by second random read command 1010C, followed by a third random read command 1010D, and then followed by a host idle time 1010E without receiving any commands from host 104. In the example shown in FIG. 10, recent parameters 1020 include receiving from host 104 a random read command 1020A, followed by a sequential write command 1020B, followed by second random read command 1020C, followed by a third random read command 1020D.

Correlation of historical parameters 1010 and recent parameters 1020 may project a next host idle time 1030. Since the historical parameter 1010A-1010D were followed by a long idle time at historical parameter 1010E, storage device 102 may transition between a sleep mode (i.e., entering, exiting, or both entering and exiting a sleep mode) after recent parameter 1020D during projected next host idle time 1030 since recent parameters 1020A-1020D correlate or match the historical parameters 1010A-1010D.

In other examples, correlating may include matching or associating the same, similar, or dissimilar historical parameters and recent parameters of host-storage device workload to project a next host idle time and to project a transition between a sleep mode for storage device.

Figure 11:
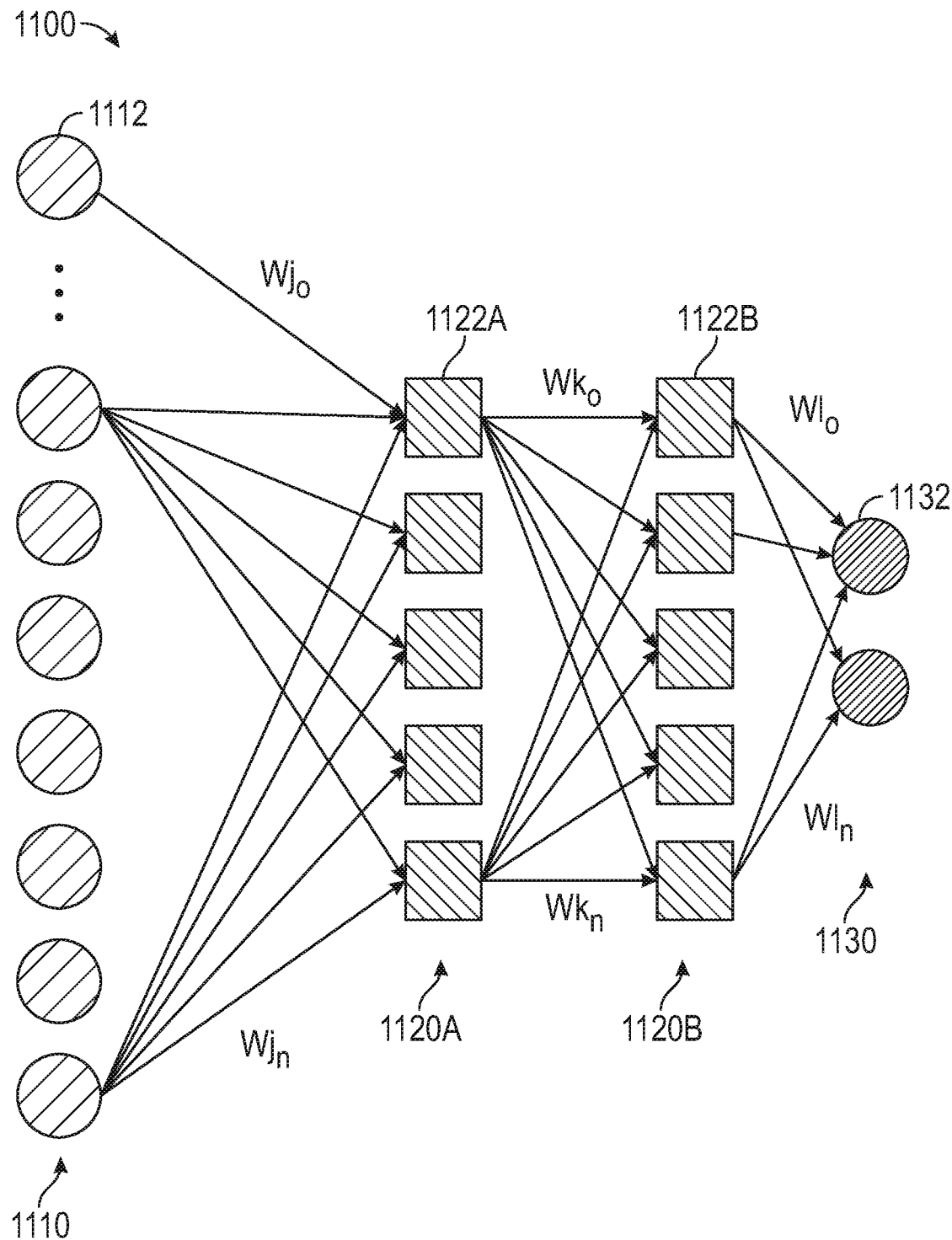
FIG. 11 is a schematic diagram of one example of a topography for neural network.

FIG. 11 is a schematic diagram of one example of a topography 1100 for neural network 150. For ease of illustration, topography 1100 is described in reference to storage device 102, but other storage devices may be applicable. Topography 1100 of neural network 150 includes an input layer 1110, one or more hidden layers 1120, and an output layer 1130. Input layer 1110 includes a plurality of nodes 1112. Hidden layer 1120 includes a plurality of nodes 1122. Output layer 1130 includes a plurality of nodes 1132.

Neural network 150 may learn and adapt the timings for entering sleep mode and/or exiting sleep mode to correspond more accurately to when host 104 is idle and when host 104 is active (i.e., issuing command to storage device 102).

In certain embodiments, neural network 150 may correlate an idle pattern on interface 114 between host 104 and storage device 102. The idle pattern may be correlated from various parameters.

For example, nodes 1112 of input layer 1110 may include one or more of the following parameters from storage device 102 or host 104: (1) idle state triggers; (2) sleep mode triggers; (3) command LBA ranges; (4) command types; (5) command queue contents; (6) storage device operational states; (7) storage device register contents; (8) sensors; and (9) other suitable parameters. These parameters may be from historical operations of host 104 and/or storage device 102 and from recent operations of host 104 and/or storage device 102. The historical operations and recent operations of host 104 and/or storage device 102 are correlated to provide more accurate projections of entering and/or exiting sleep mode.

Idle state triggers may include details of host idle times of host 104, such as a start of a host idle, an end of a host idle, and a duration of a host idle. The idle state triggers are correlated to other historical and recent parameters of host-storage device workload to project a next host idle time.

Sleep mode triggers may include details of sleeps mode times of storage device 102, such as start of a sleep mode, an end of a sleep mode, a duration of a sleep mode. Sleep mode triggers may include determining transitions between a sleep mode and may include determining whether such sleep mode transition determinations were accurate. Determining whether sleep mode transition determinations were accurate include whether host 104 woke up storage device 102, whether storage device 102 was in the process of transitioning from a sleep mode to an active mode, or whether storage device 102 has already transitioned from a sleep mode to an active mode to correspond to a host active mode.

Command logical block address (LBA) range may be associated or correlated with host 104 being in a host idle state. For example, the LBA range accessed may be associated with configuration information, firmware instructions, passwords, encryption keys, or any data stored on a certain LBA range correlated to host-storage device workload. For example, host 104 may operate in a pattern in which a certain LBA range is written to or read from correlated with host 104 being in a host idle state.

Command types from host 104 may be associated or correlated with host 104 being in a host idle state. Command types from host 104 may include random read commands, random write commands, sequential read commands, sequential write commands, flush commands, administrative commands (i.e., such as determining how much storage space is available), and other commands from host 104. In certain embodiments, a pattern of command types may be correlated with host 104 being in a host idle state. When neural network 150 detects the same pattern, neural network 150 may project a next host idle time and determine a transition between a sleep mode for storage device 102.

Command queues may be submission queues, completion queues, and/or buffer queues residing in storage device 102 or residing in host 104 and may include details of the type of queues (high priority, medium priority, low priority, etc.). In certain embodiments, the depths of the queues may be correlated to a host idle time. For example, one or more command queues having a low queue depth or empty queue depth may be correlated to host-storage device workload and a next host idle time.

Storage device operational states may include whether storage device 102 is a sleep mode, low-power state, or full-power state. Storage device operational states may be used to determining whether sleep mode transition determinations were accurate.

Register contents in storage device 102 may include a host memory page size (such as when storage device 102 is operating as virtual memory), a PCIe configuration (such as a maximum TLP payload size, a maximum memory read request size), NVMe queue arbitration mechanisms, controller memory buffer enabled or disabled in storage device 102, and other relevant registers. The content of certain registers may provide indicators to past and/or current host-storage device workload to project a next host idle time.

For example, sensors may be temperature sensors, audio sensor, touch sensor, motion sensor, accelerometers, light sensors, GPS, etc. For instance, the sensors may be in host 104 or storage device 102 used in autonomous driving to determine if the vehicle is in motion or is stationary (such as at a recharging station). For instance, the sensors may be in host 104 or storage device 102 used in a laptop or desktop computer to determine if the laptop or desktop is in a lighted or dark environment. Sensors may provide environmental indicators correlated to past and/or current host-storage workload.

Neural network 150 evaluates the parameters and may determine whether the projected time to enter sleep mode and/or to exiting sleep mode was accurate, such as waking up storage device 102 in an active mode to receive activity/commands from host 104. Each node 1112 of input layer 1110 may be coupled to one or more nodes 1122 of hidden layer 1120. If there are multiple hidden layers 1120 (such as a first hidden layer 1120A and a second hidden layer 1120B), each node 1122A of first hidden layer 1120A may be coupled to one or more nodes 1122B of hidden layers 1120B. Each node 1122B of the last hidden layer 1120B is coupled to one or more nodes 1132 of output layer 1130.

Nodes 1132 of output layer 1130 may provide one or more parameters and/or adjustments of sleep mode for storage device 102. For example, node 1132A of output layer 1130 may provide an optimal time for storage device 102 to enter sleep mode. Node 1132B of output layer 1130 may provide a duration of how long storage device 102 shall remain in sleep mode.

Neural network 150 may adjust the weight (Wj) of the importance of the connections/signals between input layer 1110 and hidden layer 1120, may adjust the weight (Wk) of the importance of the connections/signals between multiple hidden layers 1120A, 1120B, and may adjust the weight (Wl) of the importance of the connections/signals between hidden layer 1120 and output layer 1130.

As parameters for nodes 1112 of input layer 1110 are updated with recent parameters in conjunction with past parameters and past projections, the neural network 150 adjusts the projections, such as next entry time to enter sleep mode and/or the next exit time to exit sleep mode, with increased accuracy.

Topography 1100 of neural network 150 may have any suitable number of nodes 1112, 1122, 1132 and any suitable number of hidden layers 1120. The nodes 1112, 1122, 1132 may be fully connected between the layers or partially connected. The connections between the nodes of input layer 1110, hidden layer(s) 1120, and output layer 1130 may forward signals/decisions forwards and backwards through the layers to determine a decision or output from output layer 1130.

In certain embodiments, initial training of neural network 150 may be conducted by the manufacturer of storage device 102 and/or may be conducted by the vendor of storage device 102 in the factory or laboratory. Thereafter, neural network 150 may be further trained or updated to adapt to a particular user or host 104 based upon online activity of storage device 102.

For example, neural network 150 may be trained offline using supervised learning. Benchmarks may be used to input initial parameters into neural network 150 to define initial outputs of when to enter sleep mode and/or when to exit sleep mode. Initial input and output group may be used in offline supervised learning to train neural network 150. Neural network 150 may be trained online using reinforcement learning. Reinforcement learning may be more suitable for an online use of storage device 102 since it may be difficult to label input/output groups as correct or incorrect as is done in supervised learning. Reinforcement learning uses a reward function to balance the correlation of historical parameters and recent parameters to project a next host idle time. The recent parameters may be similar or dissimilar to historical parameters. Reinforcement learning may be better suited to correlate uncharted recent parameters.

Neural network 150 adapts to a particular user or host 104 activity to provide a more accurate entry time and/or exit time to sleep mode for storage device 102. For example, neural network 150 adapts to a particular user or host 104 behavior since the inputs of input layer 1110 are dependent on a particular user behavior. In other example, neural network 150 adapts to a particular user or host 104 behavior since the update of neural network 150 is tailored to determine if projected host idle times were accurate for that storage device 102 for that particular host-storage device workload.

Figure 12:
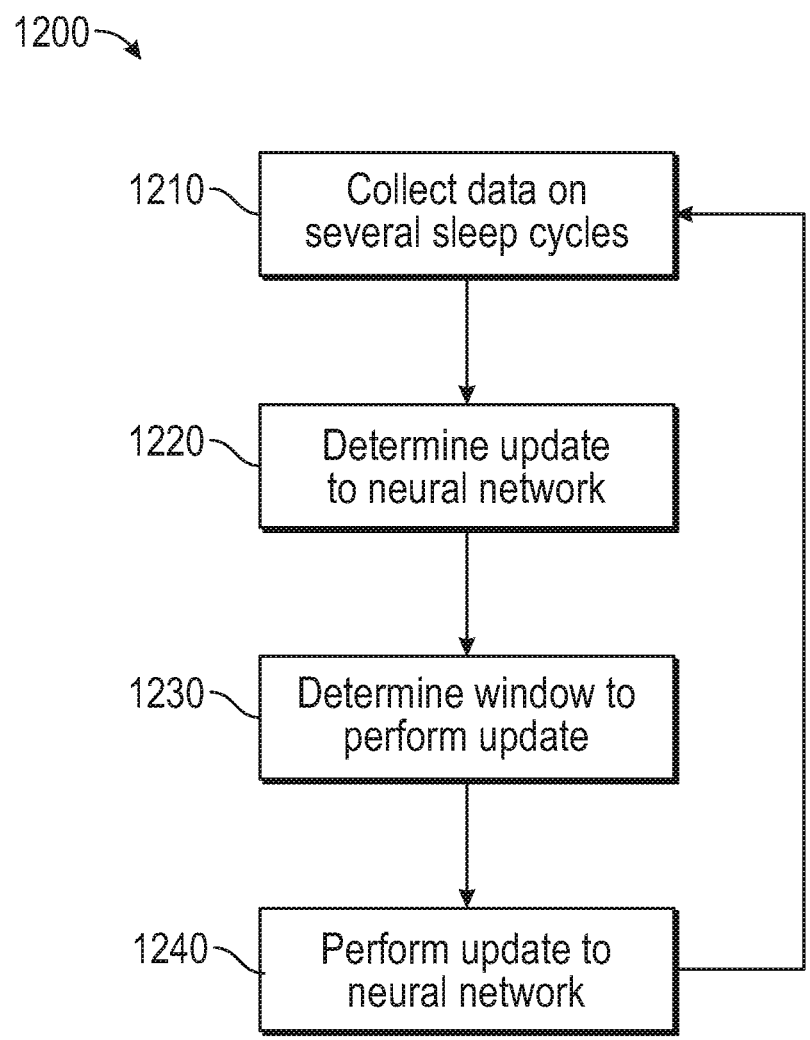
FIG. 12 is a flow diagram of one embodiment of a method of updating or online training of neural network of storage device.

FIG. 12 is a flow diagram of one embodiment of a method 1200 of updating of neural network 150 of storage device 102 by neural network update module 152. For ease of illustration, method 1200 is described in reference to storage device 102 of FIG. 1 and topography 1100 of FIG. 11, but other storage devices and topographies may be applicable.

At block 1210, data is collected of the sleep modes of storage device 102. The data may include when storage device entered and exited sleep mode along with one or more parameters discussed in reference to neural network 150.

At block 1220, neural network 150 determines if the sleep mode projections accurately corresponded to actual idle times of host 104 and determines a correction or update of neural network 150 for future sleep mode projections. The correction or update at block 1220 may be an update to the weight of the connections/signals between nodes 1112, 1122, and 1132 of neural network 150.

At block 1230, controller 108 determines a window to update neural network 150 (i.e., adjust the weights between nodes 1112, 1122, 1132). For example, a window may correspond to an idle time of host 104. For example, a window may correspond to a sleep mode of storage device 102. For example, a window may correspond to inactivity between host 104 and storage device 102, such as during reset and initialization of host 104 and/or of storage device 102. In certain embodiments, the window should have a duration long enough for an update to be performed.

At block 1240, controller 108 performs the update to neural network 150 in the window at block 1230. During the update to neural network 150, neural network 150 may not be functioning or available to receive input on parameters and/or to output a sleep mode projection. Updating neural network 150 during the window determined at block 1230 helps to reduce the impact of neural network 150 being unavailable or not functioning.

Method 1200 may be repeated based upon new inputs and new parameters to further adjust neural network 150 to provide more accurate projections of transitioning between a sleep mode.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal.

In certain embodiments, controller 108 executes computer-readable program code (e.g., software or firmware) executable instructions (herein referred to as "instructions"). The instructions may be executed by various components of controller 108, such as processor 116, neural network 150, neural network update module 152, logic gates, switches, application specific integrated circuits (ASICs), programmable logic controllers, embedded microcontrollers, and other components of controller 108.

EXAMPLES

The following are examples to illustrate various embodiments of a non-binary decoder operable to decode data storage in a data storage device. For illustration purposes, these examples will be described in reference to storage device 102 described in FIG. 1. Such examples are not meant to limit the scope of the disclosure unless specifically set forth in the claims.

In this example, the storage memory controller ASIC has a sleep mode with a wake-up time of 2 milliseconds. The storage memory controller ASIC operates at 400 MHz. Simulations were conducted to determine the estimated gain in the time to wake up compared with the time from a sleep mode setting.

Example 1 is the ideal topography of a neural network (NN) having with zero inaccuracy. The ideal topography takes 300 microseconds to wake up the storage device 102.

Example 2 has a NN topography of 5 layers in which each layer has 10 nodes. The power consumed for one node for one iteration of NN is 91 pA·s. The power consumed for the NN is 50 nodes times 91 pA·s=4.58 n·s. The NN occupies 10,851 um² of space on the storage memory controller ASIC chip. Example 2 has 10% precision degradation in projecting the wake up time. The latency for the NN topography to wake up the system is the sleep mode latency times the inaccuracy+the latency to execute the NN wakeup command. Therefore, the latency in Example 2 is (2000 microseconds×10%)+300 microseconds=500 microseconds. The gain of Example 2 using the NN in comparison with the sleep mode is the latency of sleep mode divided by the latency of the NN. Therefore, the gain in Example 2 is 2,000 microseconds/500 microseconds for a four times gain using the NN of Example 2.

Example 3 has a NN topography of 3 layers in which each layer has 30 nodes. The power consumed for one node for one iteration of NN is 91 pA·s. The power consumed for the NN is 90 nodes times 91 pA·s=8.2 n·s. The NN occupies 19,533 um² of space on the storage memory controller ASIC chip. Example 3 has 30% precision degradation in projecting the wake up time. The latency for the NN topography to wake up the system is the sleep mode latency times the inaccuracy+the latency to execute the NN wakeup command. Therefore, the latency in Example 3 is 2000 microseconds×30%)+300 microseconds=900 microseconds. The gain of Example 3 using the NN in comparison with the sleep mode is the latency of sleep mode divided by the latency of the NN. Therefore, the gain in Example 3 is 2,000 microseconds/900 microseconds for a 2.2 times gain using the NN of Example 3.

Example 4 has a NN topography of 1 layer in which each layer has 50 nodes. The power consumed for one node for one iteration of NN is 91 pA·s. The power consumed for the NN is 50 nodes times 91 pA·s=4.58 n·s. The NN occupies 10,851 um² of space on the storage memory controller ASIC chip. Example 4 has 50% precision degradation in projecting the wake up time. The latency for the NN topography to wake up the system is the sleep mode latency times the inaccuracy+the latency to execute the NN wakeup command. Therefore, the latency in Example 4 is 2000 microseconds×50%)+500 microseconds=1.300 microseconds. The gain of Example 4 using the NN in comparison with the sleep mode is the latency of sleep mode divided by the latency of the NN. Therefore, the gain in Example 3 is 2,000 microseconds/1,300 microseconds for a 1.54 times gain using the NN of Example 4.

TABLE 1

| Example | Topo. | Power (nA · s) | Area um² | Inaccuracy | Latency (usec) | Gain |
|---|---|---|---|---|---|---|
| 1 | Ideal | N/A | N/A | 0% | 300 | 6.67 |
| 2 | 5 layers 10 nodes | 4.58 | 10,851 | 10% | 500 | 4 |
| 3 | 3 layers 30 nodes | 8.2 | 19,533 | 30% | 900 | 2.2 |
| 4 | 1 layer 50 nodes | 4.58 | 10,851 | 50% | 1300 | 1.54 |

While the foregoing is directed to embodiments of the present disclosure, other and further embodiments of the disclosure may be devised without departing from the basic scope thereof, and the scope thereof is determined by the claims that follow.

What is claimed is:

1. A method of transitioning between a sleep mode for a storage device to reduce power consumption and to increase responsiveness, comprising:
   collecting one or more recent parameters related to host-storage device workload, wherein the collected one or more recent parameters comprises a command queue depth;
   correlating the host-storage device workload to project a next host idle time; and determining a transition between a storage sleep mode.

2. The method of claim 1, further comprising collecting one or more historical parameters related to the host-storage device workload.

3. The method of claim 2, wherein the host-storage device workload is correlated by comparing the collected one or more recent parameters and the collected one or more historical parameters.

4. The method of claim 1, wherein the collected one or more recent parameters further comprises a command type selected from a group consisting of random read command, random write command, sequential read command, sequential write command, and flush command, and administrative command.

5. The method of claim 1, wherein the collected one or more recent parameters further comprises an accessed logical block addresses range.

6. A storage device, comprising:
   a non-volatile memory; and a controller coupled to the non-volatile memory, the controller comprising a host interface and a neural network, the neural network operable to:
  receive one or more parameter inputs of host storage-device workload; and
  output a sleep mode projection for the storage device based upon the one or more parameter inputs.

7. The storage device of claim 6, further comprising a neural network update module.

8. The storage device of claim 7, wherein the neural network update module is operable to determine an accuracy of the sleep mode projection and to update the neural network.

9. The storage device of claim 7, wherein the neural network update module is operable to update the neural network by updating a weight value between nodes of the neural network.

10. The storage device of claim 7, wherein the neural network is operable to update the neural network during a host idle time.

11. The storage device of claim 7, wherein the neural network update module is operable to determine an accuracy of the sleep mode projection by determining if the sleep mode projection accurately projected a host idle time.

12. A method of transitioning between a sleep mode for a storage device to reduce power consumption and to increase responsiveness, the storage device comprising a controller having a neural network, the method comprising:
  offline training of the neural network;
  determining a sleep mode projection using the neural network during online use of the storage device; and
  online training of the neural network by determining if the sleep mode projection is accurate and by updating the neural network.

13. The method of claim 12, wherein offline training comprises supervised learning.

14. The method of claim 12, wherein online training comprises reinforcement learning.

15. The method of claim 12, furthering comprising updating the neural network during a host idle time.

16. The method of claim 15, wherein the host idle time is a projected host idle time.

17. The method of claim 15, wherein updating the neural network adapts the neural network to the online use of a user.

18. A storage device, comprising:
  a non-volatile memory means;
  an interface means for interfacing with a host; and
  a neural network controller means for determining a sleep mode projection, the neural network controller means coupled to the non-volatile memory means and the interface means.

19. The storage device of claim 18, wherein the neural network controller means is operable to collect historical parameters related to past host-storage device workload.

20. The storage device of claim 18, wherein the neural network controller means is operable to collect recent parameters related to recent host-storage device workload.

21. The storage device of claim 18, wherein the neural network controller means is operable to collect an input from a sensor selected from a group consisting of a storage device sensor, a host sensor, or a sensor connected to the host.

22. The storage device of claim 18, wherein the neural network controller means is operable to tailor the sleep mode projection based upon an online use of the storage device.

23. The storage device of claim 18, wherein the neural network controller means is operable to determine a sleep mode projection by correlating a workload between the host and the storage device.

24. A method of transitioning between a sleep mode for a storage device to reduce power consumption and to increase responsiveness, comprising:
  correlating one or more parameters of a host-storage device workload to project a next host idle time using a neural network;
  determining a sleep mode projection based upon the projected next host idle time;
  determining whether the sleep mode projection was accurate; and
  modifying the neural network based upon the determination of whether the sleep mode projection was accurate.

25. The method of claim 24, further comprising determining a window to modify the neural network.

26. The method of claim 24, wherein the one or more parameters is selected from a group consisting of idle state triggers, sleep mode triggers, command LBA ranges, command types, command queue contents, storage device operational states, storage device register contents; and sensors.

27. The method of claim 26, wherein correlating the one or more parameters comprises correlating one or more parameters from a historical host-storage device workload and one or more parameters from a recent host-storage device workload.

28. The method of claim 27, wherein the neural network is further modified based upon the recent host-storage device workload.

29. The method of claim 28, wherein the recent host-storage device workload is from online use.

* * * * *